(12) United States Patent
Schreter

(10) Patent No.: US 12,481,659 B2
(45) Date of Patent: *Nov. 25, 2025

(54) QUERY PROCESSING FOR DISK BASED HYBRID TRANSACTIONAL ANALYTICAL PROCESSING SYSTEM

(71) Applicant: SAP SE, Walldorf (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/779,632

(22) Filed: Jul. 22, 2024

(65) Prior Publication Data

US 2024/0378205 A1    Nov. 14, 2024

Related U.S. Application Data

(63) Continuation of application No. 17/332,575, filed on May 27, 2021, now Pat. No. 12,072,885.

(51) Int. Cl.
*G06F 16/2455* (2019.01)
*G06F 12/123* (2016.01)
*G06F 16/22* (2019.01)
*G06F 16/242* (2019.01)
*G06F 16/2457* (2019.01)
*G06F 16/248* (2019.01)

(52) U.S. Cl.
CPC ...... *G06F 16/24552* (2019.01); *G06F 12/123* (2013.01); *G06F 16/2282* (2019.01); *G06F 16/2428* (2019.01); *G06F 16/24556* (2019.01); *G06F 16/24573* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 2014/0052713 A1* | 2/2014 | Schauer | G06F 16/244 |
| | | | 707/E17.082 |
| 2017/0371973 A1* | 12/2017 | Finlay | G06F 16/2282 |
| 2022/0156260 A1* | 5/2022 | Edara | G06F 16/2237 |

* cited by examiner

*Primary Examiner* — Dawaune A Conyers
(74) *Attorney, Agent, or Firm* — Mintz Levin Cohn Ferris Glovsky and Popeo, P.C.

(57) ABSTRACT

A method for processing a query may include receiving a query associated with one or more predicate columns and one or more aggregate columns. To respond to the query, one or more partial data pages including the one or more predicate columns but not the one or more aggregate columns may be loaded from disk to memory. For each partial data page, a first value occupying the one or more predicate columns may be evaluated to identify one or more rows satisfying a predicate associated with the query. A portion of a data page containing the aggregate columns may be loaded from disk into memory. A result of the query corresponding to a second value occupying the aggregate columns may be generated based on the portion of the data page loaded in the memory. Related systems and articles of manufacture are also provided.

18 Claims, 10 Drawing Sheets

QUERY PROCESSING FOR DISK BASED HYBRID TRANSACTIONAL ANALYTICAL PROCESSING SYSTEM

CROSS REFERENCE TO RELATED APPLICATIONS

This application is a continuation of U.S. patent application Ser. No. 17/332,575 filed May 27, 2021, entitled "QUERY PROCESSING FOR DISK BASED HYBRID TRANSACTIONAL ANALYTICAL PROCESSING SYSTEM." The disclosure of which is incorporated herein by reference in its entirety.

TECHNICAL FIELD

The subject matter described herein relates generally to database processing and more specifically to a query processing for a disk based hybrid transactional analytical processing (HTAP) system.

BACKGROUND

A database may be configured to store an organized collection of data. For example, data held in a relational database may be organized in accordance with a schema defining one or more relations, each of which being a set of tuples sharing one or more common attributes. The tuples of a relation may occupy the rows of a database table while the columns of the database table may store the values of the common attributes shared by the tuples. Moreover, one or more attributes may serve as keys that establish and identify relationships between the relations occupying different database tables. The database may support a variety of database operations for accessing the data stored in the database. For instance, the database may support transactional processing (e.g., on-line transactional processing (OLTP)) that modifies the data stored in the database. Alternatively and/or additionally, the database may support analytical processing (e.g., on-line analytical processing (OLAP)) that evaluates the data stored in the database.

SUMMARY

Systems, methods, and articles of manufacture, including computer program products, are provided for processing a query. In some example embodiments, there is provided a system that includes at least one processor and at least one memory. The at least one memory may include program code that provides operations when executed by the at least one processor. The operations may include: receiving a query associated with one or more predicate columns and one or more aggregate columns; responding to the query by at least loading, from a disk into memory, one or more partial data pages corresponding to the one or more predicate columns but not the one or more aggregate columns; evaluating, for each of the one or more partial data pages, a first value occupying the one or more predicate columns to identify one or more rows satisfying a predicate associated with the query; loading, from the disk into a memory, a first portion of a data page containing the one or more aggregate columns; and generating, based at least on the first portion of the data page loaded in the memory, a result of the query corresponding to a second value occupying the one or more aggregate columns.

In some variations, one or more features disclosed herein including the following features can optionally be included in any feasible combination. The data page containing the one or more rows may be identified based at least on an identifier of the one or rows satisfying the predicate.

In some variations, a second portion of the data page not containing the one or more aggregate columns may not be loaded into the memory in order to determine the result for the query.

In some variations, the query may include an analytical processing query operating on the one or more predicate columns and the one or more aggregate columns.

In some variations, the memory may include a first cache for storing partial data pages and a second cache for storing full data pages. The first portion of the data page may be loaded in the first cache.

In some variations, a data structure may be updated to indicate that the first portion of the data page has been loaded into the first cache. In response to the first data structure indicating that the data page has been loaded into the first cache in its entirety, the data page may be transferred from the first cache to the second cache.

In some variations, in response to loading the first portion of the data page into the memory, one or more cache replacement policies may be applied to evict a second portion of another data page from the first cache.

In some variations, the one or more cache replacement policies may include a least recently used (LRU) policy and a least frequently used (LFU) policy.

In some variations, each partial data page may include some but not all of the rows included in a database table.

In some variations, one or more input output (IO) operations may be performed to access the first portion of the data page stored in the disk. The one or more input output operations may be performed asynchronously by executing one or more coroutines.

In some variations, the one or more rows may be identified by at least filtering the one or more predicate columns based at least on whether the first value occupying the one or more predicate columns satisfies the predicate.

In some variations, the result of the query may be determined by applying, to the second value occupying the one or more aggregate columns, one or more operations including a drill up operation, a drill down operation, a slice and dice operation, an aggregation operation, a sort operation, a calculate key figures operation, and a hierarchy operation.

In some variations, the first portion of the data page may be loaded in response to a determination based at least on a metadata associated with the data page. The metadata may be stored on a metadata page in the disk. The metadata may include a byte range on the data page at which the one or more columns of data are stored.

In some variations, a data structure identifying one or more portions of the data page required for responding to the query may be generated. The data structure may include a first value for each portion of the data page required for responding to the query and a second value for each portion of the data page not required for responding to the query.

In another aspect, there is provided a method for processing a query. The method may include: receiving a query associated with one or more predicate columns and one or more aggregate columns; responding to the query by at least loading, from a disk into memory, one or more partial data pages corresponding to the one or more predicate columns but not the one or more aggregate columns; evaluating, for each of the one or more partial data pages, a first value occupying the one or more predicate columns to identify one or more rows satisfying a predicate associated with the query; loading, from the disk into a memory, a first portion of a data page containing the one or more aggregate columns; and generating, based at least on the first portion of the data page loaded in the memory, a result of the query corresponding to a second value occupying the one or more aggregate columns.

In some variations, one or more features disclosed herein including the following features can optionally be included in any feasible combination. The method may further include identifying, based at least on an identifier of the one or rows satisfying the predicate, the data page as containing the one or more rows.

In some variations, a second portion of the data page not containing the one or more aggregate columns may not be loaded into the memory in order to determine the result for the query.

In some variations, the query may include an analytical processing query operating on the one or more predicate columns and the one or more aggregate columns.

In some variations, the memory may include a first cache for storing partial data pages and a second cache for storing full data pages. The first portion of the data page may be loaded in the first cache.

In another aspect, there is provided a computer program product including a non-transitory computer readable medium storing instructions. The instructions may cause operations may executed by at least one data processor. The operations may include: receiving a query associated with one or more predicate columns and one or more aggregate columns; responding to the query by at least loading, from a disk into memory, one or more partial data pages corresponding to the one or more predicate columns but not the one or more aggregate columns; evaluating, for each of the one or more partial data pages, a first value occupying the one or more predicate columns to identify one or more rows satisfying a predicate associated with the query; loading, from the disk into a memory, a first portion of a data page containing the one or more aggregate columns; and generating, based at least on the first portion of the data page loaded in the memory, a result of the query corresponding to a second value occupying the one or more aggregate columns.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a disk based hybrid transactional analytical processing system, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
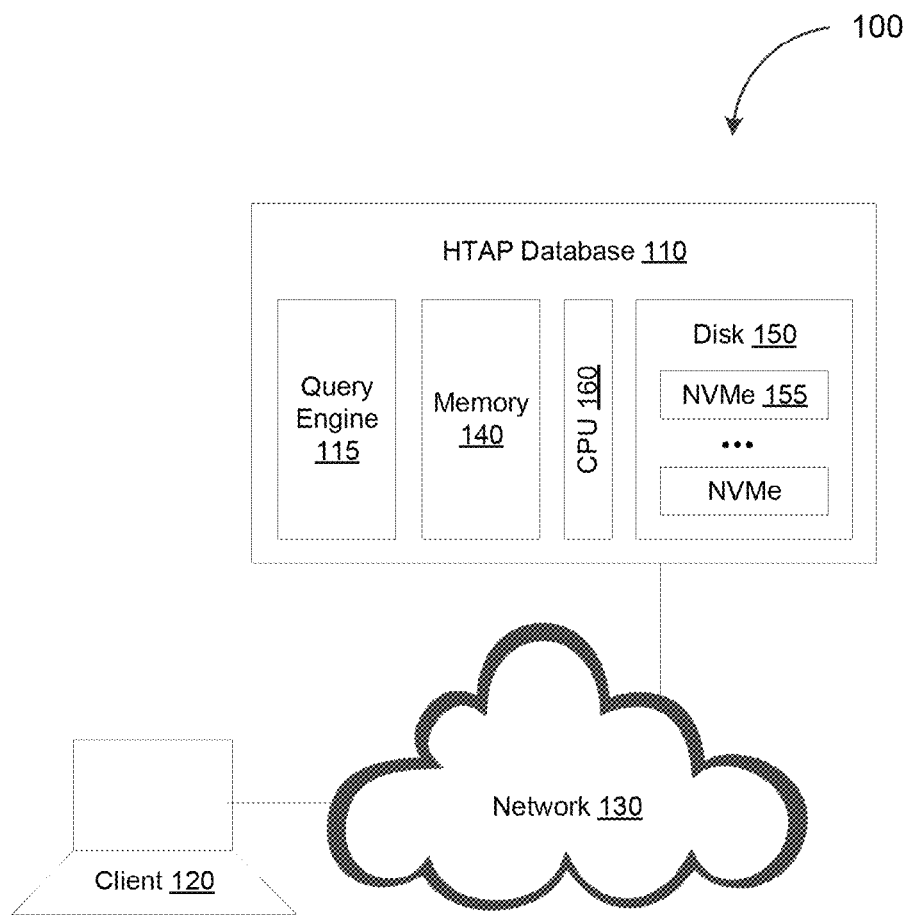
FIG. 1 depicts a system diagram illustrating an example of a database system, in accordance with some example embodiments.

A majority of conventional databases may be optimized for either transactional processing (e.g., on-line transactional processing (OLTP)) or analytical processing (e.g., on-line analytical processing (OLAP)). Although a hybrid transactional analytical processing (HTAP) database may support transactional processing as well as analytical processing, a conventional hybrid transactional analytical processing database may only be optimized for in-memory computation. A conventional hybrid transactional analytical processing database may therefore impose a high total cost of ownership (TCO) at least because the cost of main memory remains one of the largest contributors to the total cost of ownership. As such, in some example embodiments, a hybrid transactional analytical processing database may be implemented on disk in order to reduce the total cost of ownership associated with the hybrid transactional analytical processing database. For example, the hybrid transactional analytical processing database may be implemented using solid state devices (SSDs), such as non-volatile memory express (NVMe) block devices, which may be configured provide the substantially the same bandwidth as dynamic random access memory (DRAM) but at a lower cost and power consumption.

In some example embodiments, analytical processing at a disk based hybrid transactional analytical processing database may be optimized by at least caching partial data pages containing the columns of data required for each analytical processing query (e.g., on-line analytical processing (OLAP) query). For example, the disk based hybrid transactional analytical processing database may execute an analytical processing query that requires evaluating predicates from a first column and a second column of a database table to identify matching rows before querying the cells of a third column of the matching rows to compute an aggregate value. The latency and bandwidth associated with repeated disk access may be minimized by the disk based hybrid transactional analytical processing engine caching, in memory (e.g., dynamic random access memory (DRAM) and/or the like), one or more partial data pages containing the first column, the second column, and the third column. Nevertheless, conventional cache replacement policies, such as least recently used (LRU) and least frequently used (LFU), may support the loading and eviction of whole data pages but not partial data pages. As such, in some example embodiments, the disk based hybrid transactional analytical processing database may implement cache replacement policies that are optimized for the loading and eviction of partial data pages.

In some example embodiments, query processing at the disk based hybrid transactional analytical processing database may be further optimized by implementing a chunk-based approach in which a database table is accessed in one or more chunks in response to a query such as an analytical processing query, a transactional processing query, and/or the like. As used herein, a "chunk" of a database table may refer to some but not all of the rows included in the database table. For example, a chunk may be a table chunk, which may map one-to-one to a corresponding database table page or one-to-n in the case of a wide database table page. A chunk may also be a column chunk, which may be a partial data page containing column data for the respective chunk/row range of the database table. Thus, in some cases, the terminology "chunk" may refer to a partial data page. Thus, the hybrid transactional analytical processing database may respond to the query by loading, from disk, one or more chunks of the database table that contain the rows necessary for responding to the query. When combined with the loading and caching of full and partial data pages containing the data required for responding to the query, the chunk-based approach described herein may minimize the latency and bandwidth associated with the query by at limiting the scope of the table scan. Contrastingly, conventional approaches to processing a query may entail a full scan of a database table even when the query requires accessing only a portion of the database table.

FIG. 1 depicts a system diagram illustrating an example of a database system 100, in accordance with some example embodiments. Referring to FIG. 1, the database system 100 may include a hybrid transactional analytical processing (HTAP) database 110 that is coupled to a client 120 via a network 130. The network 130 may be a wired network and/or wireless network including, for example, a public land mobile network (PLMN), a local area network (LAN), a virtual local area network (VLAN), a wide area network (WAN), the Internet, and/or the like. Meanwhile, the client 130 can be a processor-based device including, for example, a mobile device, a wearable apparatus, a personal computer, a workstation, an Internet-of-Things (IoT) appliance, and/or the like.

Referring again to FIG. 1, the hybrid transactional analytical processing database 110 may include a query engine 115 and a memory 140, for example, a dynamic random access memory (DRAM) and/or the like. The hybrid transactional analytical processing database 110 may also include a disk 150 implemented using, for example, one or more solid state devices (SSDs) such as non-volatile memory express (NVMe) block devices 155. The one or more non-volatile memory express (NVMe) block devices 155, which provide persistent data storage, may provide optimal throughput (e.g., several gigabytes per second per drive), capacity (e.g., multiple terabytes), latency (e.g., 1-2 digits microseconds), and input output operation per second (IOPS) rate (e.g., up to millions). The new non-volatile memory express (NVMe) standard may also render the non-volatile memory express (NVMe) block devices 155 directly accessible from user space programs without operating system intervention.

The one or more non-volatile memory express (NVMe) block devices 155 may provide small read units, for example, 512-byte read units, 256-byte read units, and/or the like. The size of the read units associated with the one or more non-volatile memory express (NVMe) block devices 155 may correspond to 2-8 times the size of cache lines in a central processing unit (CPU) 160 used for communication with the memory 140 (e.g., dynamic random access memory (DRAM) and/or the like). That is, random access to the memory 140 is not performed in significantly smaller units than potential random access to the one or more non-volatile memory express (NVMe) block devices 155.

The bandwidth of the one or more non-volatile memory express (NVMe) block devices 155 may be comparable to the memory 140 (e.g., dynamic random access memory (DRAM) and/or the like). For example, implementing the disk 150 with ten non-volatile memory express (NVMe) block devices 155 having a 6 gigabyte per second bandwidth may achieve substantially the same bandwidth as a dynamic random access memory (DRAM) having a 64 gigabyte per second bandwidth. However, the cost associated with the one or more non-volatile memory express (NVMe) block devices 155 may be orders of magnitude lower than the dynamic random access memory (DRAM). Moreover, the one or more non-volatile memory express (NVMe) block devices may also consume orders of magnitude less power than the dynamic random access memory (DRAM).

In some example embodiments, the hybrid transactional analytical processing database 110 may be configured to provide optimized support for transactional processing (e.g., on-line transactional processing (OLTP)), which may include executing queries from the client 120 that require modifying the data stored in the hybrid transactional analytical processing database 110. Furthermore, the hybrid transactional analytical processing database 110 may be configured to provide optimized support for analytical processing (e.g., on-line analytical processing (OLAP)), which may include executing queries from the client 120 that require evaluating (e.g., drill up, drill down, slice and dice, aggregate, sort, calculate key figures, hierarchies, and/or the like) the data stored in the hybrid transactional analytical processing database 110.

Whereas the hybrid transactional analytical processing database 110 may be optimized for transactional processing as well as analytical processing, a conventional database may be optimized for either transactional processing or analytical processing. For example, a row based database may be optimized for transactional processing whereas a column-based database may be optimized for analytical processing. Moreover, according to some example embodiments, the total cost of ownership (TCO) associated the hybrid transactional analytical processing database 110 may be reduced by implementing the hybrid transactional analytical processing database 110 on disk instead of in-memory. For example, as shown in FIG. 1, instead of the memory 140, the hybrid transactional analytical processing database 110 may be implemented on the disk 150, for example, on one or more solid state devices (SSDs) such as the one or more non-volatile memory express (NVMe) block devices 155.

Figure 2A:
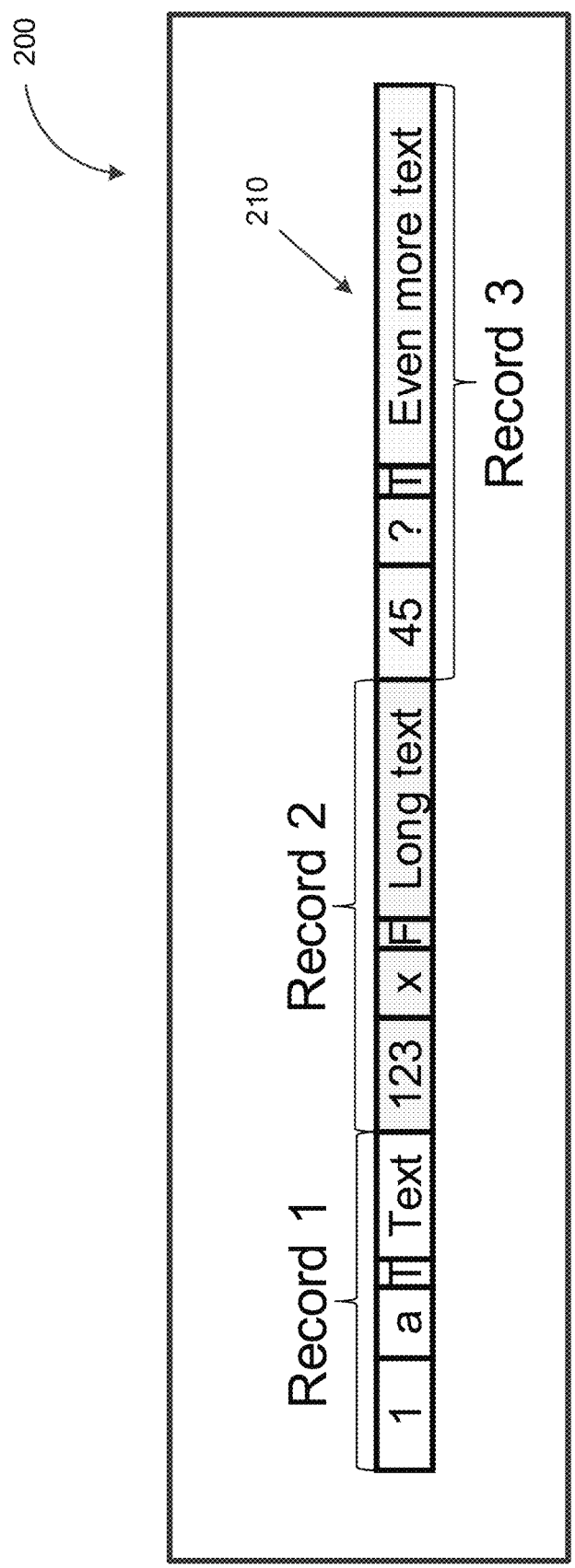
FIG. 2A depicts an example of a row based database, in accordance with some example embodiments.

To further illustrate, FIG. 2A depicts an example of a row based database 200, in accordance with some example embodiments. As shown in FIG. 2A, the rows in a database table stored in the row based database 200 may be stored in contiguous memory such that the values in the columns of the rows are stored sequentially. Because a single data page, for example, the data page 210 shown in FIG. 2A, may contain one or more entire rows from the database table (e.g., Record 1, Record 2, Record 3, and/or the like), transactional processing that modifies individual rows in the database table may be performed faster in the row based database 200. However, analytical processing may be slow in the row based database 200. For example, on-disk analytical processing may be slow because scanning one or more columns in the database table may require a full table scan and thus the loading of the entire database table from disk. In-memory analytical processing may also be slow due to poor cache locality, which may arise because cache lines may contain data from unrelated columns. Central processing unit (CPU) features, such as vectorized instructions, are not available to improve analytical processing performance in the row based database 200.

Figure 2B:
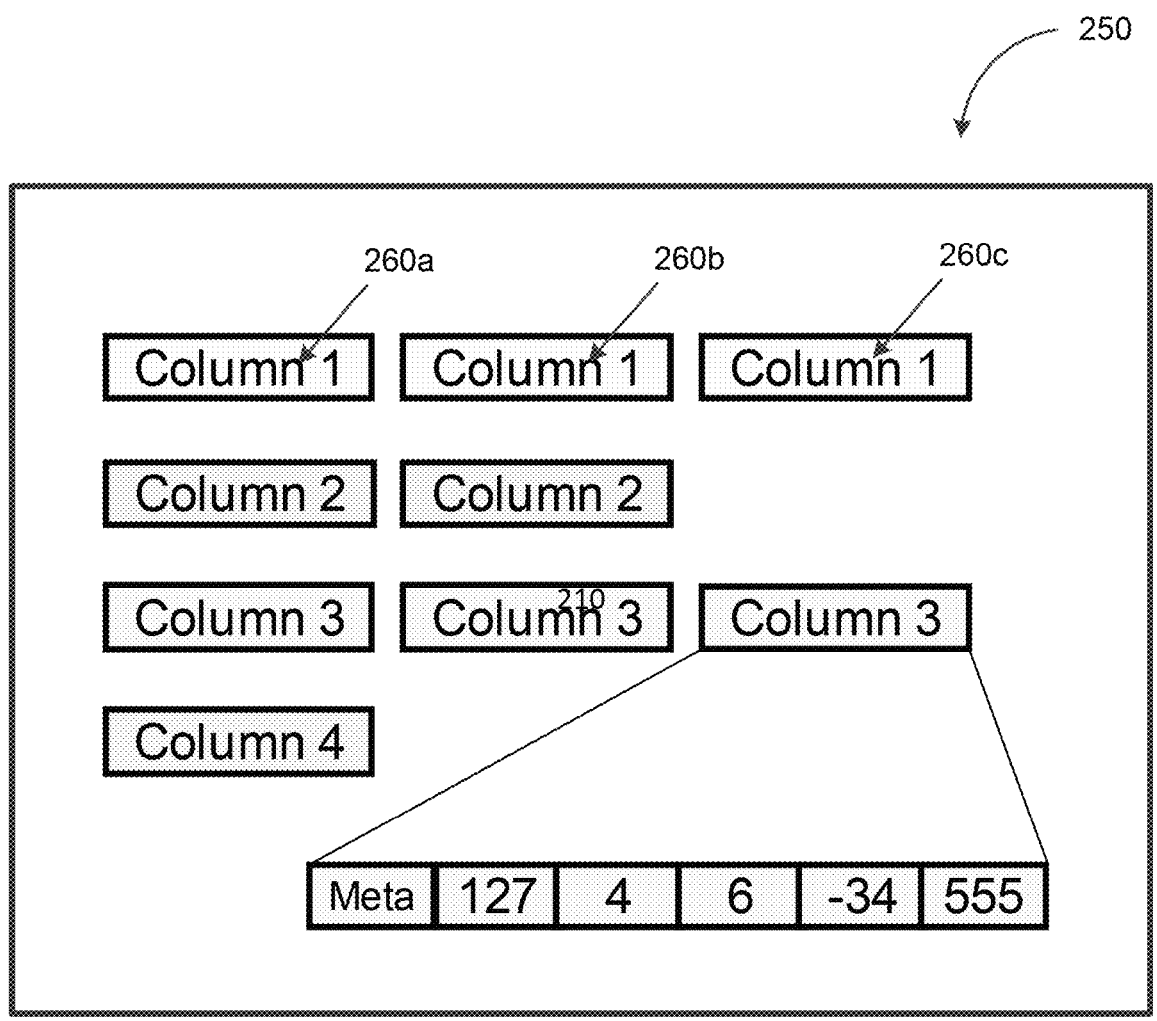
FIG. 2B depicts an example of a column based database, in accordance with some example embodiments.

FIG. 2B depicts an example of a column based database 250, in accordance with some example embodiments. As shown in FIG. 2B, the columns of a database table stored in the column based database 250 may be stored in contiguous memory (or on data pages). For example, FIG. 2B shows that a single column in a database table stored in the column based database 250 may be stored in one or more data pages such as a first data page 260a, a second data page 260b, a third data page 260c, and/or the like. For example, portions of the column may be stored across multiple data pages such that the first data page 260a, the second data page 260b, and the third data page 260c each stores a part of a column from the database table. Storing data in this manner may accelerate analytical processing because only those columns needed to perform the analytical processing may be read from memory (or disk). Moreover, central processing unit (CPU) features, such as vectorized instructions, may be available to further expedite analytical processing the column based database 250. Nevertheless, the column based database 250 may not be suitable for transactional processing because materializing a single row in the database table may require accessing multiple data pages (e.g., one data page for each column in the row). As such, a typical column based database may use only bulk loads without providing any support for transactional processing.

In some example embodiments, in order to provide optimal support for transactional processing as well as analytical processing with minimal memory footprint, the hybrid transactional analytical processing database 110 may store data in a partition attribute across (PAX) format in one or more immutable data pages, for example, in the non-volatile memory express (NVMe) block devices 155 implementing the disk 150. Each data page may include metadata identifying the contents of the data page including, for example, one or more columns and datatypes stored in the data page. This metadata may be stored redundantly in a page directory that is cached in the memory 140. Additional in-memory structures to provide optimal transactional processing and analytical processing performance may include a buffer cache for loaded data pages, columnar buffers for storing newly received data (e.g., inserts, updates, and/or the like), and a copy of the page directory identifying the contents of the data pages.

Figure 3A:
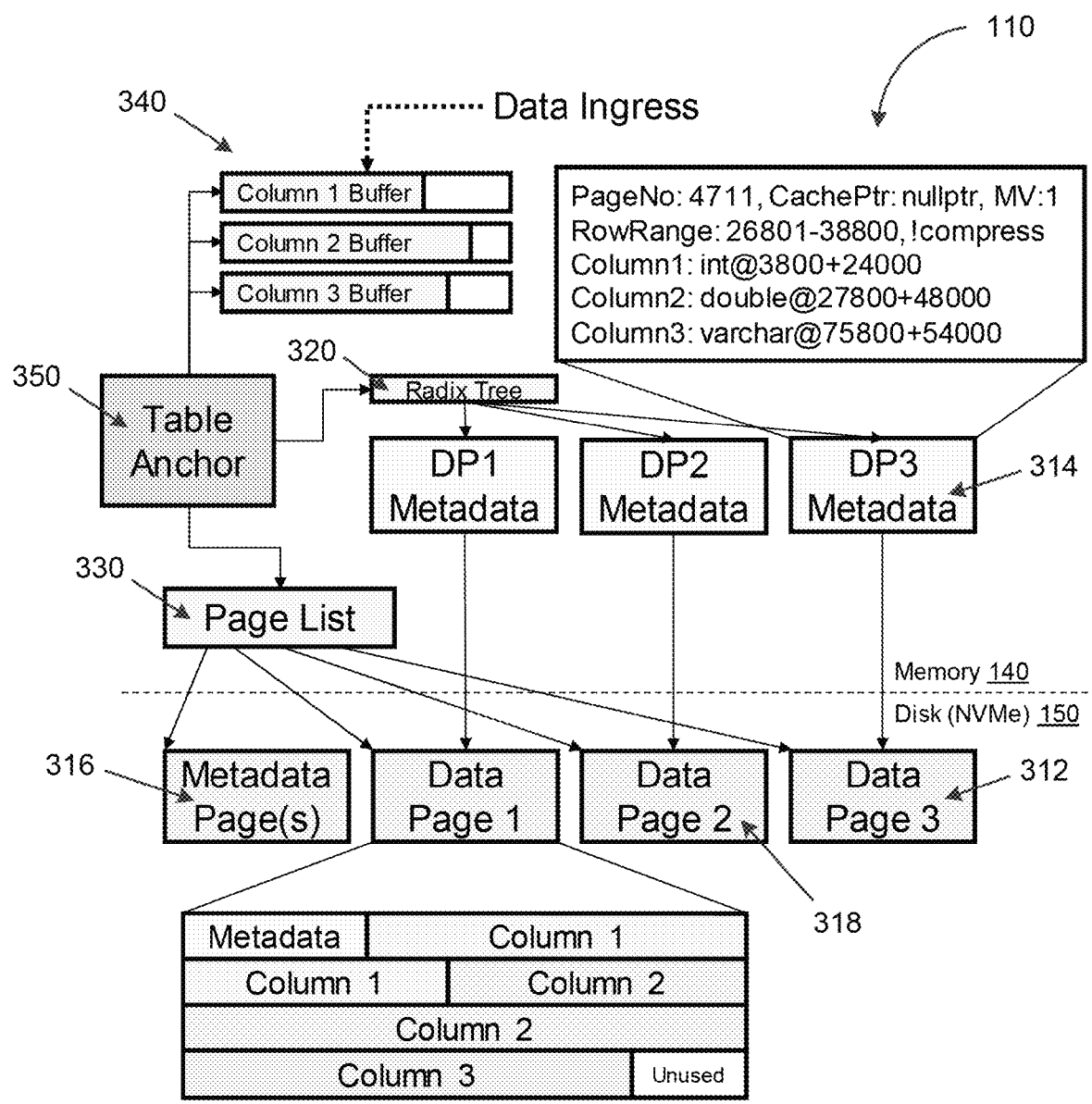
FIG. 3A depicts a schematic diagram illustrating an example of a disk based hybrid transactional analytical processing database, in accordance with some example embodiments.

To further illustrate, FIG. 3A depicts a schematic diagram illustrating an example of the hybrid transactional analytical processing database 110, in accordance with some example embodiments. In some example embodiments, data in the hybrid transactional analytical processing database 110 may be stored in a partition attribute across (PAX) format in one or more immutable data pages on the disk 150, for example, in the one or more non-volatile memory express (NVMe) block devices 155. For example, the one or more non-volatile memory express block devices 155 may store one or more metadata pages and data pages. For example, data from one or more columns in a database table may be stored in a partition attribute across (PAX) format on a data page 312 in the disk 150. As shown in FIG. 3A, the data page 312 may include multiple arrays of the various data types included in the one or more columns from the database table. Moreover, the data from the one or more columns may be prefixed with a checksum such that the integrity of the data may be verified without loading the data page 312 in its entirety. The data pages stored in the one or more non-volatile memory express (NVMe) block devices 155 may be sorted based on, for example, rows, primary keys, the temporal order in which rows are added to the data pages (e.g., which may be represented by a monotonically increasing row identifier for each newly-inserted row or a new row version after an update), and/or the like.

Referring again to FIG. 3A, the data page 312 may be associated with a metadata 314 identifying the contents of the data page 312 including, for example, the one or more columns and the datatypes stored in the data page 312. As shown in FIG. 3A, the metadata 314 associated with the data page 312 may be stored in the disk 150, for example, on one or more metadata pages 316. Moreover, FIG. 3A shows that the metadata 314 associated with the data page 312 may be cached in the memory 140 for example, as part of a page directory in a suitable data structure, such as a radix tree 320. The metadata 314 associated with the data page 312 may include a logical page number to enable a loading of the data page 312 from the disk 150, a pointer to a cache frame containing the data page 312 (e.g., if the data page 312 is present in the cache), row identifier range of one or more rows of the database table stored on the data page 312 (including a flag indicating compressed row identifier range), and metadata version to identify pages stored before last data definition language (DDL) operation to be able to migrate data accordingly on-the-fly. Furthermore, the metadata 314 associated with the data page 312 may include, for each column of the database table materialized on the data page 312, a column identifier, a datatype, an encoding, and a byte range on the data page 312 where the data of the column is located.

As shown in FIG. 3A, the memory 140 may also include another page directory, for example, a page list 330, including references to the one or more metadata pages and data pages stored in the disk 150. The memory 140 may also include one or more columnar buffers 340 storing newly received data (e.g., inserts, updates, and/or the like) for one or more columns in a database table. For example, the memory 140 may include one column buffer for each column of the database table. A table anchor 350 in the memory 140 may store references to the radix tree 320, the page list 330, and the one or more columnar buffers 340.

In some example embodiments, incoming rows of data from a database table may be decomposed into individual cells corresponding to the columns of the database table before being placed in the one or more columnar buffers 340. When the one or more columnar buffers 340 become sufficiently full to fill an entire data page (or an explicit checkpoint is executed), a new immutable data page may be created and appended to the table. For example, a new data page may be created when the columnar buffers 340 include sufficient data for a new data page. Moreover, the one or more columnar buffers 340 may be reset to ingest additional data. It should be appreciated that row identifiers may remain stable as row identifiers are generated sequentially during the ingestion of the data for each new row. Moreover, row identifier may increase monotonically such that the row identifiers may be used for quick lookups of the corresponding rows.

In some example embodiments, the visibility of the data from the database tables stored in the disk 150 for transactional processing may be determined by an external visibility framework such as, for example, multiversion concurrency control (MVCC) and/or the like. Because visibility information may include a small portion of the data from the database tables stored in the disk 150 (e.g., one bit per row over time), visibility information may be loaded into the memory 140 in its entirety. In addition to providing transactional visibility, the visibility information may also be used to identify rows of data for garbage collection. For example, a deleted row may be subject to garbage-collection when no transactions are pending to read the data associated with the row.

Garbage collection, as noted, may be performed based on the visibility information associated with the data from the database tables stored in the disk 150. As rows of data are garbage-collected, the fraction of unused space on the data pages in the disk 150 may increase. For example, when the data page 312 becomes partially used subsequent to garbage collection of one or more rows stored in the data page 312, a bitmask of deleted rows may be stored as part of the metadata 314 associated with the data page 312 and cached in the memory 140. When every row in the data page 312 are marked as deleted, the data page 312 may be deallocated.

The quantity of used space on the data page 312 may also decrease due to the execution of data definition language (DDL) statements that create and/or modify the corresponding database table. For example, one or more data definition language (DDL) statements may be executed to drop a column from the database table in which case the column may be removed from the metadata 314 associated with the data page 312 as well as freeing a corresponding quantity of bytes on the data page 312. Contrastingly, the execution of one or more data definition language statements adding a column to the database table may not necessitate any changes to the metadata 314 associated with the data page 312. One or more data definition language statements may also be executed to modify an existing column in the database table in which case the quantity of used space on the data page 312 may change in accordance to a difference in size between a previous data format and a new data format of the column.

The load factor of the data page 312, which corresponds to the quantity of used space on the data page 312, may vary due to garbage collection of one or more rows stored on the data page 312 as well as the execution of one or more data definition language (DDL) statements modifying the corresponding database table. In some example embodiments, the load factor of the data page 312 may be determined based on the visibility information (e.g., the quantity of rows in the data page 312 visible for transactional processing) and the modifications associated with the execution of one or more data definition language (DDL) statements. Moreover, the data page 312 may be merged, based on the load factor of the data page 312, with one or more neighboring data pages. For example, when the load factor of the data page 312 drops below a threshold value, the data page 312 may be merged with a data page 318 adjacent to the data page 312 in the disk 150. Alternatively and/or additionally, the data page 312 may be split into multiple data pages when the load factor of the data page 312 exceeds a threshold value. The resulting data page, which may remain immutable, may contain rows from the data page 312 as well as the data page 318 in the partition attribute across (PAX) format. Because some row identifiers may be removed during the merge, the metadata associated with merged data pages may have a set compressed row identifier flag as well as contain an additional (sorted) row identifier column to enable a quick look up of the row index within each column.

The one or more metadata page 316 storing, for example, the metadata 314 associated with the data page 312 are not subject to being overwritten in response to changes to the metadata 314. Instead, the metadata 314 associated with the data page 312 may be modified, for example, converted on the fly, when the metadata 314 is changed due the execution of one or more to modifications to the execution of one or more data definition language (DDL) statements modifying the corresponding database table. It should be appreciated that new metadata pages may be generated to accommodate new metadata associated with new data pages including, for example, new data pages that are generated by merging two existing data pages having below a threshold load factor.

In some example embodiments, there may be two types of the metadata 314. The first type may be per-page metadata, which is depicted in FIG. 3A and stored on the disk/in the page directory. The second type may be current table metadata, which is modified (in a versioned way) by executing one or more data definition language (DDL) statements on the table and of which there is always one current version. It should be appreciated that data definition language (DDL) statements may not alter the metadata on the data page 312 or in the memory 314 but may create a new version of the global metadata.

With on-the-fly conversion, subsequent to executing the data definition language (DDL) statements, a column may be associated with new metadata (e.g., the type was changed from int to varchar). Thus, loading a "new" data page may encounter the new metadata (type varchar) and interpret the data as-is. However, if an "old" data page was written before the data definition language statement is read, the reader may determine that there is no such int column in the table and will follow links between metadata versions to find out that the type needs to be converted from int to varchar. At this time, on-demand and on-the-fly, the data being loaded (integer values) may be converted into the data actually requested by the query processor (varchar values). However, it should be appreciated that this on-demand, on-the-fly conversion may be performed for those data pages written prior to the data definition language statements but not after. Garbage collection after the data definition language statement may also be a reader such that any garbage-collected and/or coalesced data pages written subsequent to the data definition language statements may have a new metadata reference (i.e., varchar in this case) and converted data.

The hybrid transactional analytical processing database 110 may, as noted, be configured to provide optimal support for transactional processing as well as analytical processing with minimal memory footprint. Transactional processing (e.g., on-line transactional processing (OLTP)) may include executing queries, for example, data manipulation language (DML) statements, that require modifying the data stored in the hybrid transactional analytical processing database 110. For example, for transactional processing requiring read access, the hybrid transactional analytical processing database 110 may include a buffer cache to expedite access as well as indices to facilitate point queries. For transactional processing that requires inserting and/or updating data, the hybrid transactional analytical processing database 110 may create a new row and write the new row into the one or more columnar buffers 340. Transactional processing that requires deleting data may be handled through data visibility (e.g., multiversion concurrency control (MVCC) operations and/or the like) and garbage collection.

Analytical processing (e.g., on-line analytical processing (OLAP)) may include, for example, the query engine 115, executing queries that require evaluating (e.g., drill up, drill down, slice and dice, aggregate, sort, calculate key figures, hierarchies, and/or the like) the data stored in the hybrid transactional analytical processing database 110. In some example embodiments, analytical processing at the hybrid transactional analytical processing database 110 may be optimized because the properties of the one or more non-volatile memory express (NVMe) block devices 155 combined with an appropriate asynchronous execution framework (e.g., C++20 coroutines and/or the like) and the column byte ranges stored in the data page metadata may enable reading selective portions of data from the one or more non-volatile memory express (NVMe) block devices 155. With a sufficient quantity of non-volatile memory express (NVMe) block devices, these optimizations may achieve substantially the same bandwidth as in-memory processing for column scan workload, which may be one of the basic building blocks of analytical processing, In some example embodiments, to execute an analytical processing query, the query engine 115 may scan one or more columns of a database table to identify one or more rows in the database table that match a predicate associated with the analytical processing query. Table 1 below depicts an example of pseudo programming code implementing an algorithm for performing a column scan.

TABLE 1

```
function scan([in] column set, [in] predicates, [out] result set):
    allocate column buffers for each column in column set
    for each page:
        if page is in memory:
            compute predicate match on loaded page
```

TABLE 1-continued

```
        else:
            for each column in column set:
                initiate I/O to load portion of the page containing the column
                into the respective
                column buffer (as indicated by column byte range; observing
                I/O alignment)
            after all I/Os completed:
                compute predicate match on column buffers
        add matched rows into result set
```

As shown in Table 1, the performance of the hybrid transactional analytical processing database 110 performing the column scan may be limited by the slowest input/output (I/O) in the path. In some example embodiments, the algorithm shown in Table 1 may be extended to initiate multiple I/Os per column in advance (e.g., multiple column parts from multiple data pages and potentially using a scatter/gather I/O functionality) to enable progress while some I/O lags as well as to make optimal use of data pages interleaved on more than one of the non-volatile memory express (NVMe) block devices 155. Nevertheless, it should be appreciated that an excessive quantity of I/Os should not be initiated per column in order to avoid a cache overflow and other adverse effects, such as starvation of other queries. Moreover, the I/O may read unnecessary data to the left and to the right of the column because the I/O must be aligned on the boundary of the one or more non-volatile memory express (NVMe) block devices 155 (e.g., typically 256 bytes to 512 bytes) but the reading of unnecessary data also effectively occurs in in-memory systems as well, since data in memory are accessed using CPU cache line units, which are typically 64 or 128 bytes in size.

The I/O bandwidth of the one or more non-volatile memory express (NVMe) block devices 155 may be optimal when the average I/O size is 4 kilobytes or larger. As such, where a significant portion of a data page is required for the analytical processing query (e.g., more than 50%), the hybrid transactional analytical processing database 110 may load entire data pages into the memory 140 instead of performing a column-based partial loading. Alternatively and/or additionally, if two or more column parts required for the analytical processing query are adjacent on the page or separated just by a small portion of a column not needed for the query (e.g., ≤1 kilobytes), the hybrid transactional analytical processing database 110 performs a single I/O to fetch the two or more column parts together.

The central processing unit 160 may have a relatively large Level 3 (L3) caches (e.g., 32 megabytes or more). As such, data read from the one or more non-volatile memory express (NMVe) block devices 155 (which may be attached to a Peripheral Component Interconnect Express (PCIe) bus) may not be loaded directly into the memory 140, but may be held first in a cache (e.g., a cache hierarchy) of the hybrid transactional analytical processing database 110, for example, in the Level 3 cache of the central processing unit 160.

When an analytical processing query requires a scan of the data, with an asynchronous execution framework (e.g., C++20 coroutines), the query engine 115 may execute the scan as soon as the data has been read from the one or more non-volatile memory express (NMVe) block devices 155 while the data is still held in the Level 3 cache of the central processing unit 160. That is, input output operations to access the one or more non-volatile memory express (NMVe) block devices 155 may be scheduled as coroutines, which may be executed asynchronously (e.g., non-blocking)

to avoid blocking threads (e.g., main user interface (UI) thread) running on the central processing unit 160 during the input output operations. Because coroutine switching may be more resource efficient, scheduling input output operations as coroutines may prevent resource waste caused by scheduling multiple threads in a blocking situation. Moreover, doing so may avoid cache misses as well as using the dynamic random access memory (DRAM) channel of the memory 140. With this optimization, the hybrid transactional analytical processing database 110 may be capable of outperforming an in-memory system as well by freeing bandwidth at the memory 140 for other operations (e.g., producing temporary results, doing reduce steps in query processing, and/or the like).

In some example embodiments, the hybrid transactional analytical processing database 110 may be optimized for parallel analytical processing queries. For example, if multiple analytical processing queries scan the same column individually, for example when common queries are executed by concurrent users, the available bandwidth may be split across the threads scanning the data. To avoid splitting the bandwidth of the one or more non-volatile memory express (NVMe) block devices 155 across multiple threads, multiple queries scanning the same column may scan the column cooperatively. Cooperation between multiple queries scanning the same column may speed up the parallel execution of the queries by at least reducing the quantity of data read from the one or more non-volatile memory express (NVMe) block devices 155.

Figure 3B:
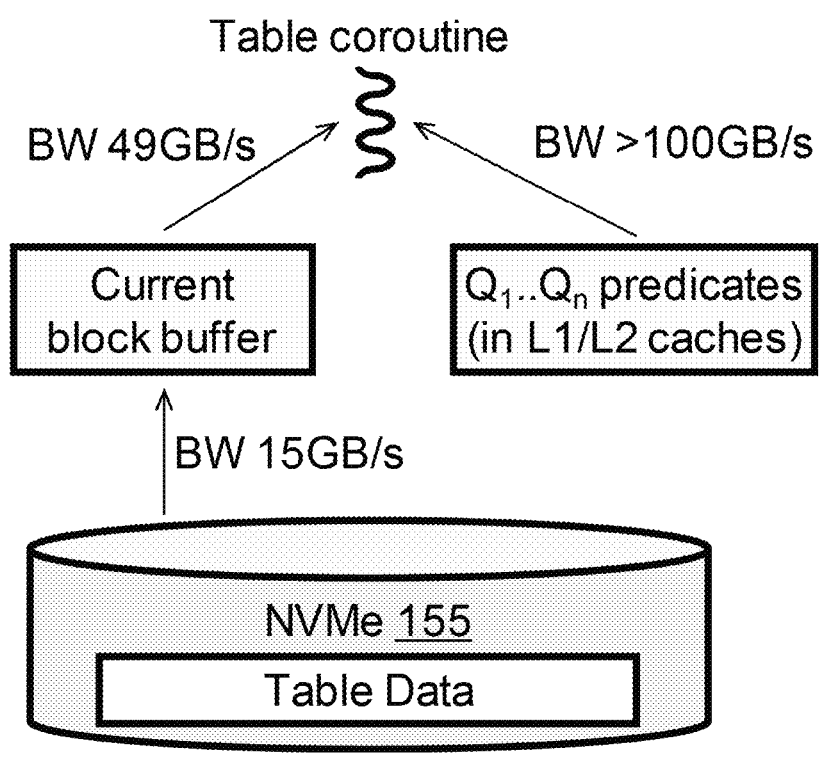
FIG. 3B depicts a schematic diagram illustrating an example of parallel analytical processing query optimization, in accordance with some example embodiments.

To further illustrate, FIG. 3B depicts a schematic diagram illustrating an example of parallel analytical processing query optimization, in accordance with some example embodiments. In some example embodiments, a first query $Q_1$ scanning a column of data and a second query $Q_2$ scanning the same column of data may cooperate in order to optimize the use of the bandwidth available at the one or more non-volatile memory express (NVMe) block devices 155. For example, upon starting the scan of the column, the first query $Q_1$ may be added to a query set associated with the scan of the column. Moreover, the column set, the predicates, and the result set reference associated with the first query $Q_1$ may be stored in a shared buffer held, for example, in a Level 1 (L1) cache and/or a Level 2 (L2) cache of the central processing unit 160. The first query $Q_1$ may scan the column of data including by fetching the data in the column from the corresponding database table sequentially. The second query $Q_2$ may join the scan at any time by being added to the query set associated with the scan of the column. Moreover, to join the scan, the column set, the predicates, and the result set reference associated with the second query $Q_2$ may be added to the shared buffer.

In some example embodiments, upon loading all of the columns required by all of the column sets associated with the first query $Q_1$ and the second query $Q_2$, the query engine 115 may evaluate the predicates stored in the shared buffer and send the respective results of the first query $Q_1$ and the second query $Q_2$ to the corresponding result sets in the shared buffer. In the event the scan reaches the end of the database table with queries remaining in the query set associated with the scan, the scanning of the database table may resume from the beginning. When the scan reaches a point at which a particular query was added to the query set associated with the scan, that query may be removed from query set and considered complete (e.g., entire database table was scanned).

The cooperative scanning of data stored in the one or more non-volatile memory express (NVMe) block devices 155 may be further extended to implement admission control. For example, prior to scanning the database table, the first query $Q_1$ and the second query $Q_2$ may be required to pass through an admission control queue. Concurrency control may be implemented by permitting no more than a threshold quantity of queries from the queue to scan each individual database table. Doing so may prevent the query set associated with the scan of a database table from growing beyond the capacity of the Level 1 (L1) cache and/or Level 2 (L2) cache of the central processing unit (CPU) 160.

In some example embodiments, the query engine 115 may implement a chunk-based approach to processing queries including, for example, analytical processing queries, transactional processing queries, and/or the like. As noted, an analytical processing query may require evaluating (e.g., drill up, drill down, slice and dice, aggregate, sort, calculate key figures, hierarchies, and/or the like) the data stored in one or more database tables the hybrid transactional analytical processing database 110.

To execute an analytical processing query, the query engine 115 may perform predicate filtering that includes identifying rows in a database table that match a predicate associated with the analytical processing query. Predicate filtering may include projecting a full multi-dimensional array of data corresponding to the database table (e.g., an on-line analytical processing (OLAP) cube) to a constrained cube of data satisfying the predicate specified in the analytical processing query. Furthermore, to execute the analytical processing query, the query engine 115 may materialize the results of the predicate filtering, which may include computing aggregates on the values occupying the columns (e.g., dimensions) in each slice of the constrained cube.

One conventional approach to evaluating the analytical processing query is to perform predicate filtering on an entire database table, build a corresponding set of matching row identifiers, and request the values for all of the aggregate columns (e.g., dimensions) of the matching rows. This conventional approach may be sufficiently fast for an in-memory database in which all data is held in memory. Nevertheless, taking this conventional approach would require up to two full table scans (e.g., one full table scan for the predicate evaluation and one partial table scan for the aggregate materialization). In addition to the excessive disk input output overhead, this conventional approach may not be feasible in the hybrid transactional analytical processing database 110 at least because the size of the data associated with a full predicate evaluation may exceed the capacity of the memory 140.

Accordingly, the query engine 115 may implement a chunk-based approach to processing a query in which a database table required for responding to the query is accessed in chunks. Each chunk of the database table may include some but not all of the rows included in the database table. To process a query, such as an analytical processing query or a transactional processing query, the query engine 115 may process the database table in individual chunks and store the corresponding aggregate values in the memory 140. One implementation of the chunk-based approach may include requesting the data from all of the predicate columns and aggregate columns associated with the query before evaluating the predicates and materializing the partial aggregate results for each chunk of the database table. This implementation may be suitable for a traditional page-based system with row-formatted or partition attribute across (PAX) formatted pages at least because the primary bottleneck in the traditional page-based system may be associated with loading the data pages containing the predicate columns from disk. Nevertheless, this implementation of the chunk-based approach may still require full table scans to process analytical processing queries.

In some example embodiments, the query engine 115 may implement a chunk-based approach to processing a query that avoids full table scans. Notably, combining a chunk-based approach that loads select rows of a database table with the loading of partial data pages containing the columns of data required for responding to a query may further minimize the loading of data not needed for responding to the query. For analytical processing queries with low data selectivity, the query engine 115 may implement a process that further minimizes the loading of unnecessary data. For example, for each chunk of a database table loaded from the disk 150, the query engine 115 may compute a set of matching row identifiers based on the predicates set forth in an analytical processing query. These matching row identifiers may be sent to the storage layer where the values from the aggregate columns (e.g., dimensions) for the corresponding rows may be retrieved from the disk 150. The data pages covered by the matching row identifiers may be computed at the storage layer, for example, by the central processing unit 160. Moreover, the central processing unit 160 may load partial data pages containing the necessary columns before selecting and returning the requested data back to the query engine 115 for competing the partial aggregation.

Without caching, the foregoing implementation of the chunk-based approach to query processing may engender a full scan of the predicate columns plus a partial scan of the aggregate columns. When combined with caching, particularly the partial page caching described in more detail below, queries that require repeated access to the same data may be further optimized. For example, caching partial data pages may expedite repeated access to data in a same column (or portion thereof) when a partial data page containing the column is cached the memory 140. Transactional processing queries may benefit from the caching of full data pages in the memory 140, which the hybrid transactional analytical processing database 110 may support along with partial page caching. Moreover, transactional processing queries operating on some but not all columns of a large database table may benefit from the selective loading of data into the memory 140. The combination of chunk-based processing and caching may therefore minimize the quantity of data that is transferred from the disk 150 to respond to a query such as an analytical processing query or an analytical transactional query. For example, the quantity of data transferred from the disk 150 to the memory 140 may be reduced to a minimum required for responding to an analytical processing query (e.g., an on-line analytical processing (OLAP) query), which may correspond to the modulo of partial column alignment overhead.

In some example embodiments, the hybrid transactional analytical processing database 110 may support the caching of partial data pages in order to further enhance the performance of the hybrid transactional analytical processing database 110. For example, analytical processing that requires the hybrid transactional analytical processing database 110 to operate on one or more columns of data from a database table may be optimized by the hybrid transactional analytical processing database 110 selectively loading, from the one or more non-volatile memory express (NVMe) block devices 155 forming the disk 150, partial data pages containing the one or more columns of data. That is, instead of loading the data page 312 in its entirety, the hybrid transactional analytical processing database 110 may selectively load the portions of the data page 312 required for executing an analytical processing query (e.g., an on-line analytical processing (OLAP) query). For instance, whereas a single data page (e.g., having a partition attribute across (PAX) format) may range in size from 64 kilobytes to 256 kilobytes, the hybrid transactional analytical processing database 110 may load the data page in 256-byte (or 512-byte) blocks. Additional reduction in latency and bandwidth may be achieved by caching, for example, in the memory 140, the partial data pages loaded from the disk 150.

Figure 4:
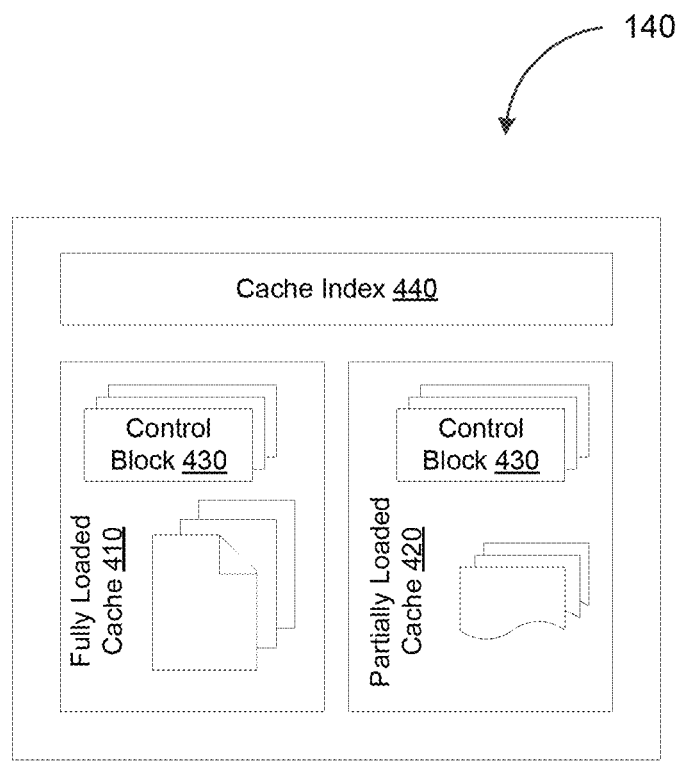
FIG. 4 depicts a schematic diagram illustrating an example of a memory configured to implement partial page caching, in accordance with some example embodiments.

FIG. 4 depicts a schematic diagram illustrating an example of the memory 140 configured to implement partial page caching, in accordance with some example embodiments. Referring to FIG. 4, the memory 140, which forms the caching layer of the hybrid transactional analytical processing database 110, may include a fully loaded cache 410 (e.g., a "hot" partition) for caching full data pages and a partially loaded cache 420 (e.g., a "cold" partition) for caching partial data pages. The memory 140 may further include one or more control blocks, such as the control block 430, configured for tracking the partial data pages that are present in the partially loaded cache 420 of the memory 140.

The control blocks 430 may be mapped one-to-one to the full data pages in the fully loaded cache 410 and the partial data pages in the partially loaded cache 420. A single control block 430 may describe a corresponding data page loaded in the memory 140 (e.g., where in cache the data page resides, which subpages have been loaded, etc.) and is anchored at a cache index 440, which may be a hash table and/or the like. The cache index 440 may be used to check if a full data page and/or a partial data page is already loaded and update the corresponding control block 430 upon loading a full data page and/or partial data page. Upon expiration, a full data page and/or a partial data page may be removed from the cache index.

Table 2 below depicts an example of pseudo programming code implementing a control block such as the control block 430. As shown in Table 2, for each partial data page that is loaded into the memory 140, the hybrid transactional analytical processing database 110 may update a corresponding control block to indicate the presence of the partial data page in the memory 140. For example, for each 256-byte (or 512-byte) block of the data page 312 that is loaded into the memory 140, the hybrid transactional analytical processing database 110 may update a data structure (e.g., a bitmask, a bit field, and/or the like) included in a corresponding control block to indicate the presence of the blocks in the memory 140. The size of the data structure may correspond corresponding to the quantity of blocks in the data page 312. For instance, if the data page 312 is 256 kilobytes in size with 512-byte blocks, the data structure may include 512 bits, each of which indicative of whether a corresponding block of the data page 312 is loaded into the memory 140.

TABLE 2

```
struct CB {
  bit loaded_blocks[ ]; // bitmask of loaded blocks
  page_number_t page_number; // page number on disk, which is
  contained in this CB
  page_size_t page_size; // page size indication (might be implicit)
  void* page_data_ptr; // pointer to actual loaded page data in
  buffer cache
  cache_replacement_policy_data_t cache_replacement_policy_data;
  // out-of-scope
};
```

Referring again to FIG. 4, the memory 140 may include the fully loaded cache 410 (e.g., a "hot" partition) for caching full data pages and the partially loaded cache 420 (e.g., a "cold" partition) for caching partial data pages. Caching partial data pages and full data pages in separate partitions of the memory 140 may prevent a single scan of a single column of a large database table from causing a complete cache eviction. With full data pages cached in the fully loaded cache 410 and partial data pages cached in the partially loaded cache 420, a scan of a single column of a large database table may cause the eviction of partial data pages but not the eviction of full data pages from the memory 140. Keeping at least some full data pages in the memory 140 may therefore improve the response time for transactional processing queries (e.g., on-line transactional processing (OLTP) queries).

In some example embodiments, the hybrid transactional analytical processing database 110 may load full data pages (e.g., the data page 312) into the fully loaded cache 410 and partial data pages (e.g., blocks from the data page 312) into the partially loaded cache 420. If in the process of loading partial data pages into the partially loaded cache 420, a full data page is loaded into the partially loaded cache 420, the hybrid transactional analytical processing database 110 may transfer the full data page from the partially loaded cache 420 to the fully loaded cache 410. For example, in order to respond to an analytical processing query, the hybrid transactional analytical processing database 110 may load blocks of the data page 312 into the partially loaded cache 420. The blocks of the data page 312 that have been loaded into the partially loaded cache 420 may be tracked, for example, via a data structure (e.g., a bitmask, a bit field, and/or the like) included in the control block 430. Upon determining that every block of the data page 312 have been loaded into the partially loaded cache 420, the hybrid transactional analytical processing database 110 may transfer the data page 312 to the fully loaded cache 410.

The hybrid transactional analytical processing database 110 may apply any cache replacement policy when loading and evicting full data pages and partial data pages. Table 3 below depicts an example of pseudo programming code implementing cache replacement policies at the fully loaded cache 410 and the partially loaded cache 420. It should be appreciated that the hybrid transactional analytical processing database 110 may apply the same cache replacement policy or different cache replacement policies at the fully loaded cache 410 and the partially loaded cache 420. Examples of cache replacement policies include least recently used (LRU), least frequently used (LFU), and/or the like.

TABLE 3

```
struct CacheRoot {
    cache_replacement_policy_head_t fully_loaded_cache;
    cache_replacement_policy_head_t partially_loaded_cache;
};
```

In some example embodiments, the hybrid transactional analytical processing database 110 may support integrity checks on partially loaded data pages and fully loaded data pages. For example, the entire contents of the data page 312 may be associated with a checksum, which may be used to detect errors when the data page 312 is loaded from the disk 150 to the memory 140 in its entirety. Furthermore, each data range, such as a column, a portion of a column, or the metadata associated with a data page, may be associated with its own partial checksum (e.g., in the header of each column). The partial checksum associated with each data range may be used to detect errors when that data range is loaded from the disk 150 to the memory 140. For example, each block of the data page 312 may be associated with a partial checksum, which may be used to verify the contents of the individual blocks loaded from the disk 150 to the memory 140.

In some example embodiments, the hybrid transactional analytical processing database 110 may handle block ranges instead of byte ranges. As such, the portions of a column required to perform an analytical processing query may be loaded along with portions of other columns, but those columns may not be subject to any integrity checks. To avoid this scenario, the hybrid transactional analytical processing database 110 may verify the checksum of every completely-loaded column, even when those columns are loaded before or after the column that is actually required to respond to the analytical processing query. Moreover, the control block, such as the control block 430, may include a second data structure (e.g., a bitmask, a bit field, and/or the like) configured to track the individual columns that have been loaded into memory 140 (e.g., into the fully loaded cache 410 or the partially loaded cache 420). The hybrid transactional analytical processing database 110 may determine, based at least on this second data structure, when to compute and verify the checksum for a column. It should be appreciated that this second data structure may be variable in size, depending on the quantity of columns present in a database table.

Figure 5:
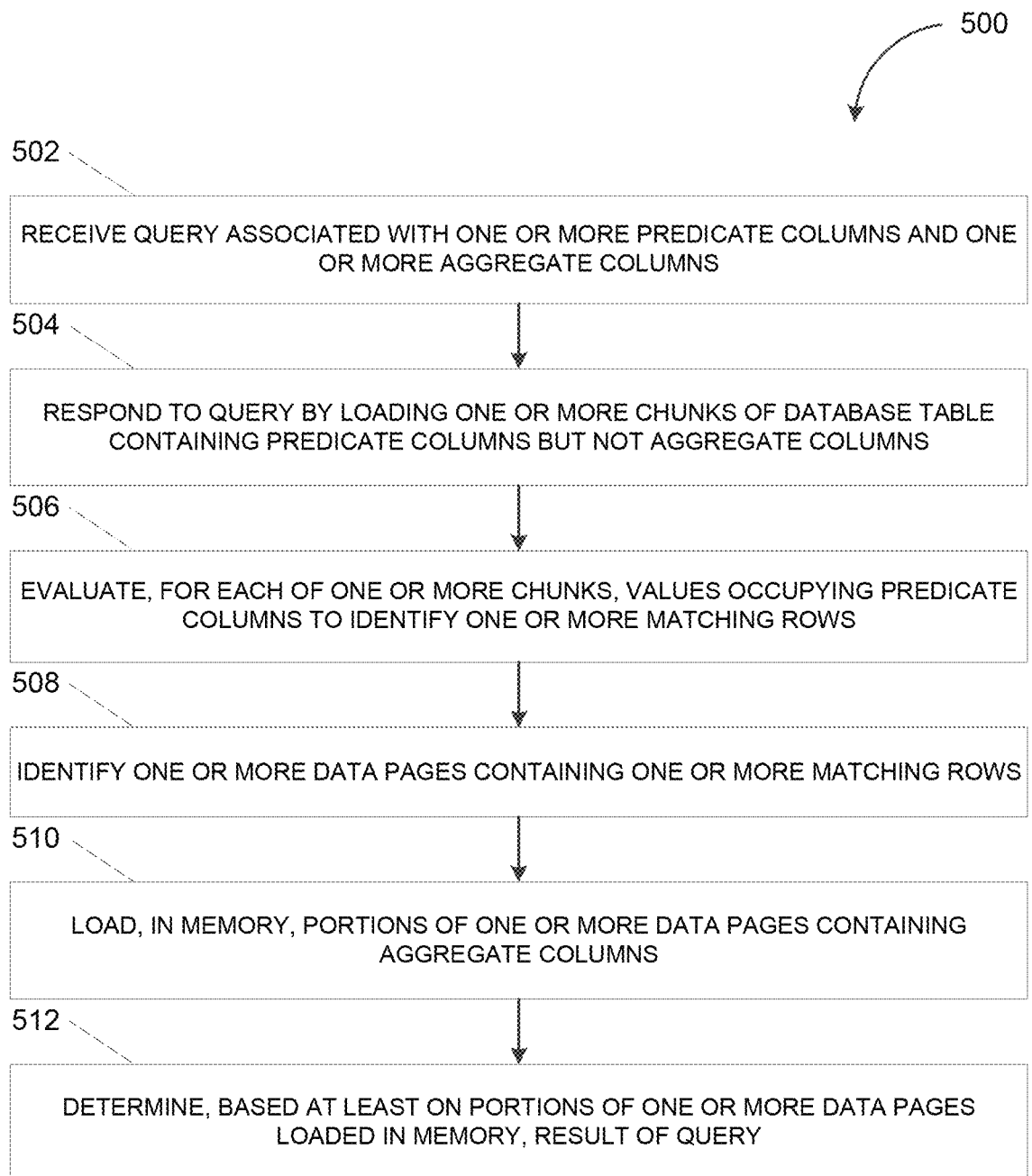
FIG. 5 depicts a flowchart illustrating an example of a process for chunk-based query processing, in accordance with some example embodiments.

FIG. 5 depicts a flowchart illustrating an example of a process 500 for chunk-based query processing, in accordance with some example embodiments. Referring to FIGS. 1, 2A-B, 3A-B, and 4-5, the process 500 may be performed by the hybrid transactional analytical processing database 110 to perform one or more queries including, for example, analytical processing queries (e.g., on-line analytical processing (OLAP) queries), transactional processing queries (e.g., on-line transactional processing (OLTP) queries), and/or the like.

At 502, the hybrid transactional analytical processing database 110 may receive a query associated with one or more predicate columns and one or more aggregate columns. In some example embodiments, an analytical processing query (e.g., an on-line analytical processing (OLAP) query) may require evaluating the values in one or more columns of data to identify rows satisfying a predicate before determining an aggregate value based on the values in one or more other columns of the matching rows. For example, the analytical processing query may require evaluating predicates from a first column and a second column of the database table to identify one or more matching rows before querying the cells of a third column of the matching rows to generate a result of the query including by applying one or more operations such as a drill up operation, a drill down operation, a slice and dice operation, an aggregation operation, a sort operation, a calculate key figures operation, a hierarchy operation, and/or the like. In this example, the first column and the second column may be predicate columns (or dimensions) while the third column may be an aggregate column (or dimension).

At 504, the hybrid transactional analytical processing database 110 may respond to the query by loading one or more partial data pages of the database table containing the predicate columns but not the aggregate columns. As noted, each chunk of a database table may include some but not all of the rows in the database table. To respond to the analytical processing query, which requires evaluating predicates in the first column and the second column of the database table, the query engine 115 may load chunks of the database table including the first column and the second column. The hybrid transactional analytical processing database 110, for example, the query engine 115, may avoid loading the third column of the database table at least because the third column of the database table is an aggregate column containing values needed for subsequent operations (e.g., drill up, drill down, slice and dice, aggregate, sort, calculate key figures, hierarchies, and/or the like).

At 506, the hybrid transactional analytical processing database 110 may, for each of the one or more chunks, evaluate the values occupying the one or more predicate columns to identify one or more matching rows. As noted, the analytical processing query (e.g., the on-line analytical processing (OLAP) query) may require filter, based on the predicates specified in the query, values from the first column and the second column of the database table to identify one or more matching rows. Accordingly, to process the analytical processing query, the query engine 115 may evaluate the values included in the first column and the second column of the database table that are part of each chunk of the database table to identify one or more rows of the database table satisfying the predicates.

At 508, the hybrid transactional analytical processing database 110 may identify one or more data pages containing the one or more matching rows. In some example embodiments, the execution of the analytical processing query may be optimized by selectively loading the data required for the query. For example, upon identifying the rows of the database table satisfying the predicates specified in the analytical processing query, the query engine 115 may send the matching row identifiers to the storage layer (e.g., the central processing unit 160) to retrieve the corresponding portions of the data pages containing these rows of data.

At 510, the hybrid transactional analytical processing database 110 may load, in the memory 140, portions of the one or more data pages containing the aggregate columns. For example, the central processing unit 160 in the storage layer of the hybrid transactional analytical processing database 110 may determine, based at least on the matching row identifiers, the data pages containing the rows satisfying the predicates of the analytical processing query. However, instead of loading full data pages from the disk 150, the hybrid transactional analytical processing database 110 may be configured to return portions of these data pages containing the third column, which contains the values required for subsequent operations (e.g., drill up, drill down, slice and dice, aggregate, sort, calculate key figures, hierarchies, and/ or the like). To retrieve these partial data pages, the hybrid transactional analytical processing database 110 may access the disk 150 (e.g., the one or more non-volatile memory express (NVMe) block devices 155 asynchronously to maximize throughput. The partial data pages containing the third column may be returned to the query engine 150 for further processing.

At 512, the hybrid transactional analytical processing database 110 may determine, based at least on the portions of the one or more data pages loaded in the memory 140, a result for the query. For example, the partial data pages containing the third column may be loaded to the memory 140, which may be configured to support the caching of partial data pages and full data pages. To determine a result for the analytical processing query, the query engine 150 may operate on the partial data pages, for example, in the memory 140, in order to compute one or more aggregate values based at least on the values included in the third column of the database table.

Figure 6A:
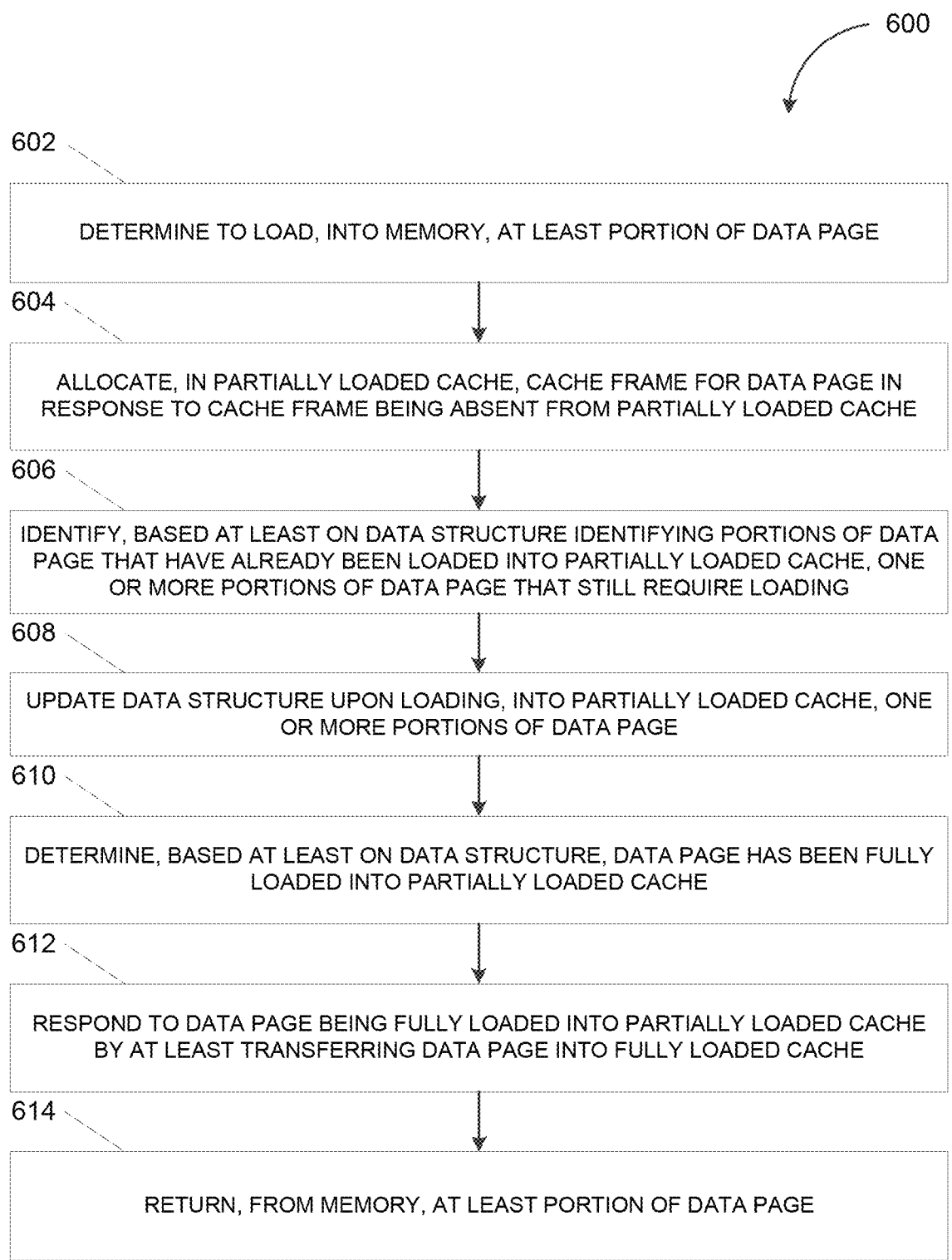
FIG. 6A depicts a flowchart illustrating an example of a process for caching partial data pages, in accordance with some example embodiments.

FIG. 6A depicts a flowchart illustrating an example of a process 600 for caching partial data pages, in accordance with some example embodiments. Referring to FIGS. 1, 2A-B, 3A-B, 4, 6A, the process 600 may be performed by the hybrid transactional analytical processing database 110 to load, into the memory 140, partial data pages such as, for example, one or more blocks from the data page 312. The loading of partial data pages may occur when the hybrid transactional analytical database 110 executes an analytical processing query, which requires transferring portions of a data page, such as the data page 312, from the disk 150. These portions of the data page may contain, for example, the columns of a database table that are needed for executing the analytical processing query. For example, the analytical processing query may require evaluating predicates from a first column and a second column of the database table to identify one or more matching rows before querying the cells of a third column of the matching rows to compute an aggregate value, in which case the hybrid transactional analytical database 110 may transfer the portions of the data page 312 containing the first column, the second column, and the third column.

At 602, the hybrid transactional analytical processing database 110 may determine to load, into the memory 140, at least a portion of a data page. In some example embodiments, the column byte ranges stored in the metadata associated with the data page 312 may enable reading select portions of the data page 312 from the disk 150 (e.g., the one or more non-volatile memory express (NVMe) block devices 155). Accordingly, upon receiving an analytical processing query (e.g., an on-line analytical processing (OLAP) query), the hybrid transactional analytical processing database 110 determine the portions of the data page 312 required for responding to the analytical processing query and generate a corresponding data structure (e.g., a bitmask, a bitfield, and/or the like). For example, the hybrid transactional analytical processing database 110 may generate a first data structure (e.g., to_be_loaded_blocks) including a first value (e.g., "1") for each block of the data page 312 required for responding to the analytical processing query and a second value (e.g., "0") for each block of the data page 312 not required for responding to the analytical processing query.

At 604, the hybrid transactional analytical processing database 110 may allocate, in the partially loaded cache 420, a cache frame for the data page in response to the cache frame being absent from the partially loaded cache 420. For example, if a cache frame associated with the data page 312 is not present in the partially loaded cache 420, the hybrid transactional analytical processing database 110 may allocate a new cache frame to accommodate the portions of the data page 312 being loaded into the partially loaded cache 420. In doing so, the hybrid transactional analytical processing database 110 may evict another data page from the partially loaded cache 420 including by applying a cache replacement policy such as least recently used (LRU), least frequently used (LFU), and/or the like. The cache frame may be allocated to include a control block, such as the control block 430, in which the values occupying a second data structure (e.g., CB.loaded_blocks) for tracking the loaded portions of the data page 312 are set to zero.

At 606, the hybrid transactional analytical processing database 110 may identify, based at least on a data structure identifying portions of the data page that have already been loaded into the partially loaded cache 420, one or more portions of the data page that still require loading. In some example embodiments, the portions of the data page 312 that still require loading into the partially loaded cache 420 may be identified based on the first data structure identifying the portions of the data page 312 that requires loading (e.g., to_be_loaded_blocks) and the second data structure identifying the portions of the data page 312 already loaded into the partially loaded cache 420 (e.g., CB.loaded_blocks). Because these data structures may be bitmasks (or bit fields), the hybrid transactional analytical processing database 110 may perform one or more bitwise operations in order to determine the portions of the data page 312 that still require loading into the partially loaded cache 420. For example, the hybrid transactional analytical processing database 110 may generate a third data structure (e.g., blocks_to_load) that corresponds to the result of applying one or more bitwise operations on the first data structure and the second data structure (e.g., blocks_to_load=~CB.loaded_blocks & to_be_loaded_blocks). The third data structure may include a first value (e.g., "1") for each block of the data page 312 still needs to be loaded into the partially loaded cache 420 and a second value (e.g., "0") for each block of the data page 312 that does not require loading into the partially loaded cache 420.

At 608, the hybrid transactional analytical processing database 110 may update the data structure upon loading, into the partially loaded cache 420, the one or more portions of the data page. In some example embodiments, the hybrid transactional analytical processing database 110 may load, into the partially loaded cache 420, the portions of the data page 312 that the third data structure (e.g., blocks_to_load) indicates as requiring loading. For example, for each i where the third data structure blocks_to_load [i] is set to the first value (e.g., "1"), the hybrid transactional analytical processing database 110 may load a corresponding block from the disk 150 (e.g., first_block_of_page(CB.page_number)+i) to the memory 140 (e.g., at location CB.page_data_ptr+i× block_size). Moreover, the hybrid transactional analytical processing database 110 may update the second data structure (e.g., CB.loaded_blocks) tracking the portions of the data page 312 loaded into the partially loaded cache 420. For instance, the second data structure (e.g., CB.loaded_blocks) may be updated by performing one or more bitwise operations between the second data structure and the third data structure (e.g., CB.loaded_blocks=CB.loaded_blocks|blocks_to_load).

At 610, the hybrid transactional analytical processing database 110 may determine, based at least on the data structure, that the data page has been fully loaded into the partially loaded cache 420. In some example embodiments, the second data structure (e.g., CB.loaded_blocks) may include a first value (e.g., "1") for each block of the data page 312 loaded into the partially loaded cache 420 and a second value (e.g., "0") for each block of the data page 312 not loaded into the partially loaded cache 420. Accordingly, the hybrid transactional analytical processing database 110 may determine that the data page 312 is fully loaded into the partially loaded cache 420 if every value included in the second data structure (e.g., CB.loaded_blocks) is set to the first value (e.g., "1").

At 612, the hybrid transactional analytical processing database 110 may respond to the data page being fully loaded into the partially loaded cache 420 by at least transferring the data page to the fully loaded cache 410. In response to determining that the data page 312 has been fully loaded into the partially loaded cache 420, the hybrid transactional analytical processing database 110 may transfer the data page 312 from the partially loaded cache 420 to the fully loaded cache 410. Transferring the data page 312 to the fully loaded cache 410 may prevent the data page 312 from being evicted prematurely from the memory 140. Keeping at least some full data pages in the memory 140 may therefore improve the response time for transactional processing queries.

At 614, the hybrid transactional analytical processing database 110 may return, from the memory 140, at least the portion of the data page. For example, the hybrid transactional analytical processing database 110 may return the portions of the data page 312 required for the analytical processing query. The hybrid transactional analytical processing database 110 may update the corresponding cache control block including data associated with the cache replacement policies being enforced by the hybrid transactional analytical processing database 110 (e.g., cache_replacement_policy_data_t cache_replacement_policy_data).

Figure 6B:
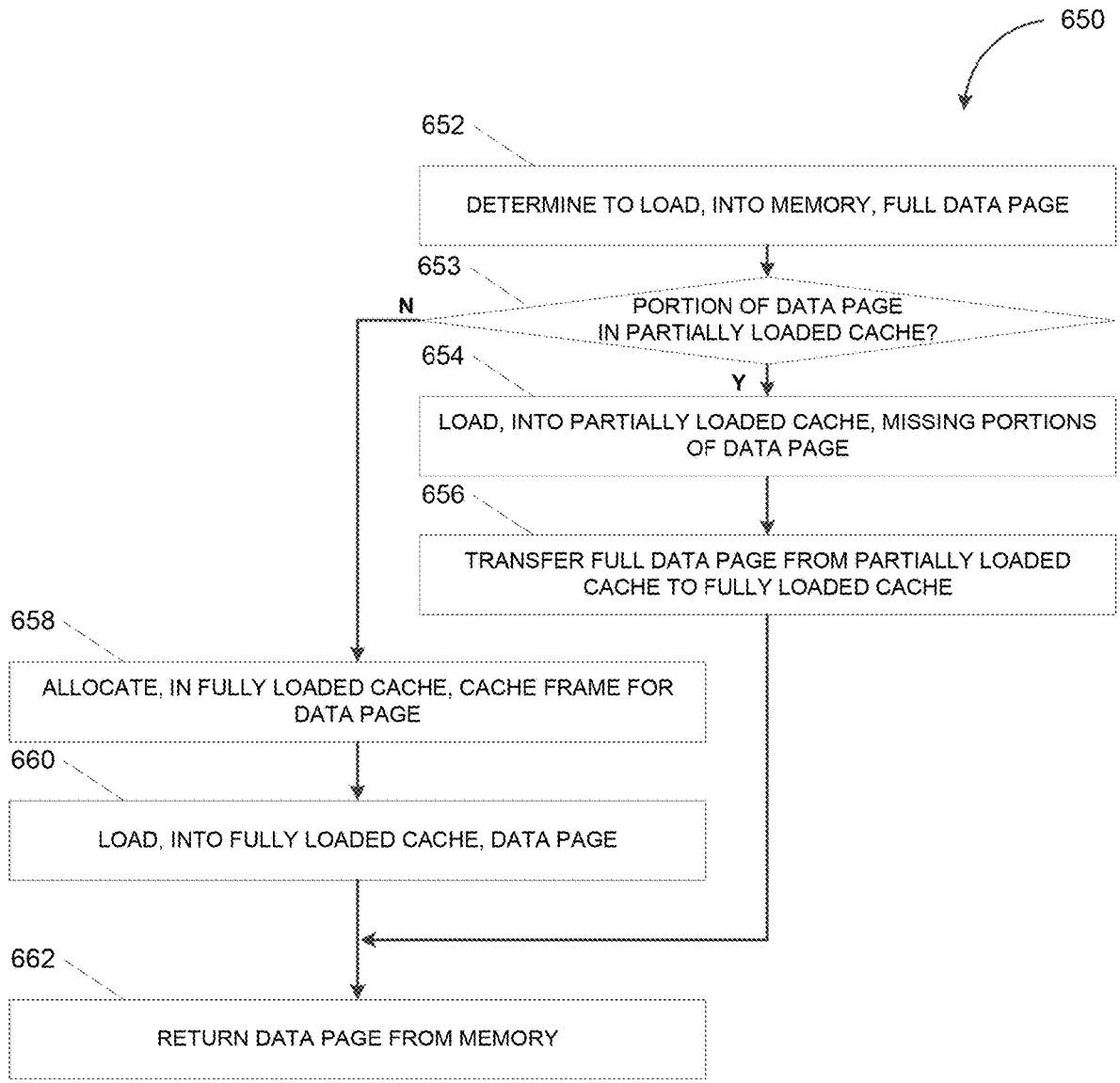
FIG. 6B depicts a flowchart illustrating an example of a process for caching full data pages, in accordance with some example embodiments.

FIG. 6B depicts a flowchart illustrating an example of a process 650 for caching full data pages, in accordance with some example embodiments. Referring to FIGS. 1, 2A-B, 3A-B, 4, 6B, the process 650 may be performed by the hybrid transactional analytical processing database 110 to cache, in the memory 140, full data pages such as, for example, the data page 312. The loading of full data pages may occur when the hybrid transactional analytical database 110 executes a transactional processing query that requires accessing entire rows of a database table.

At 652, the hybrid transactional analytical processing database 110 may determine to load, into the memory 140, a full data page. As noted, the loading of full data pages may occur when the hybrid transactional analytical database 110 executes a transactional processing query that requires accessing entire rows of a database table. Accordingly, in response to receiving a transactional processing query, the hybrid transactional analytical processing database 110 determine to load the data page 312 in its entirety.

At 653, the hybrid transactional analytical processing database 110 may determine whether a portion of the data page is in the partially loaded cache 420. For example, the transactional analytical processing database 110 may determine whether one or more blocks of the data page 312 are already present in the partially loaded cache 420. These blocks of the data page 312 may have been loaded in the partially loaded cache 420 may be required for responding to an analytical processing query and are thus loaded into the partially loaded cache 420.

At 653-Y, the hybrid transactional analytical processing database 110 may determine that a portion of the data page is in the partially loaded cache 420. As such, at 654, the hybrid transactional analytical processing database 110 may load the missing portions of the data page into the partially loaded cache 420. For example, if the hybrid transactional analytical processing database 110 determines that at least some portions of the data page 312 are present in the partially loaded cache 420, the hybrid transactional analytical processing database 110 may load the missing portions of the data page 312. The hybrid transactional analytical processing database 110 may load the missing portions of the data page 312 into an existing cache frame.

To load the missing portions of the data page 312 into the partially loaded cache 420, the hybrid transactional analytical processing database 110 may generate a first data structure (e.g., blocks_to_load) by applying one or more bitwise operations on a second data structure identifying the portions of the data page 312 already loaded into the partially loaded cache 420 and a third data structure identifying the portions of the data page 312 still missing from the partially loaded cache 420 (e.g., blocks_to_load=~CB.loaded_blocks & to_be_loaded_blocks). The first data structure may therefore include a first value (e.g., "1") for each block of the data page 312 already loaded into the partially loaded cache 420 and a second value (e.g., "0") for each block of the data page 312 that still requires loading into the partially loaded cache 420. The hybrid transactional analytical processing database 110 may load, into the partially loaded cache 420, the blocks of the data page 312 indicated as absent from the partially loaded cache 420 and update the first data structure until every value of the first data structure is set to the first value (e.g., "1").

At 656, the hybrid transactional analytical processing database 110 may transfer the full data page from the partially loaded cache 420 to the fully loaded cache 410. For example, when the data page 312 is fully loaded into the partially loaded cache 420, the hybrid transactional analytical processing database 110 may transfer the data page 312 from the partially loaded cache 420 to the fully loaded cache 410.

Alternatively, at 653-N, the hybrid transactional analytical processing database 110 may determine that a portion of the data page is not in the partially loaded cache 420. Accordingly, at 658, the hybrid transactional analytical processing database 110 may allocate, in the fully loaded cache 410, a cache frame for the data page. For example, if a cache frame associated with the data page 312 is not present in the fully loaded cache 410, the hybrid transactional analytical processing database 110 may allocate a new cache frame to accommodate the data page 312 being loaded into the fully loaded cache 410. In doing so, the hybrid transactional analytical processing database 110 may evict another data page from the fully loaded cache 410 including by applying a cache replacement policy such as least recently used (LRU), least frequently used (LFU), and/or the like. Moreover, at 560, the hybrid transactional analytical processing database 110 may load the entire data page from the disk 150 to the fully loaded cache 410. For instance, the hybrid transactional analytical processing database 110 may load the data page 312 in its entirety from the disk 150 to the fully loaded cache 410.

At 662, the hybrid transactional analytical processing database 110 may return, from the memory 140, the data page. For example, the hybrid transactional analytical processing database 110 may return the data page 312, which may be required for the transactional processing query. Furthermore, The hybrid transactional analytical processing database 110 may update the corresponding cache control block including data associated with the cache replacement policies being enforced by the hybrid transactional analytical processing database 110 (e.g., cache_replacement_policy_data_t cache_replacement_policy_data).

Figure 7:
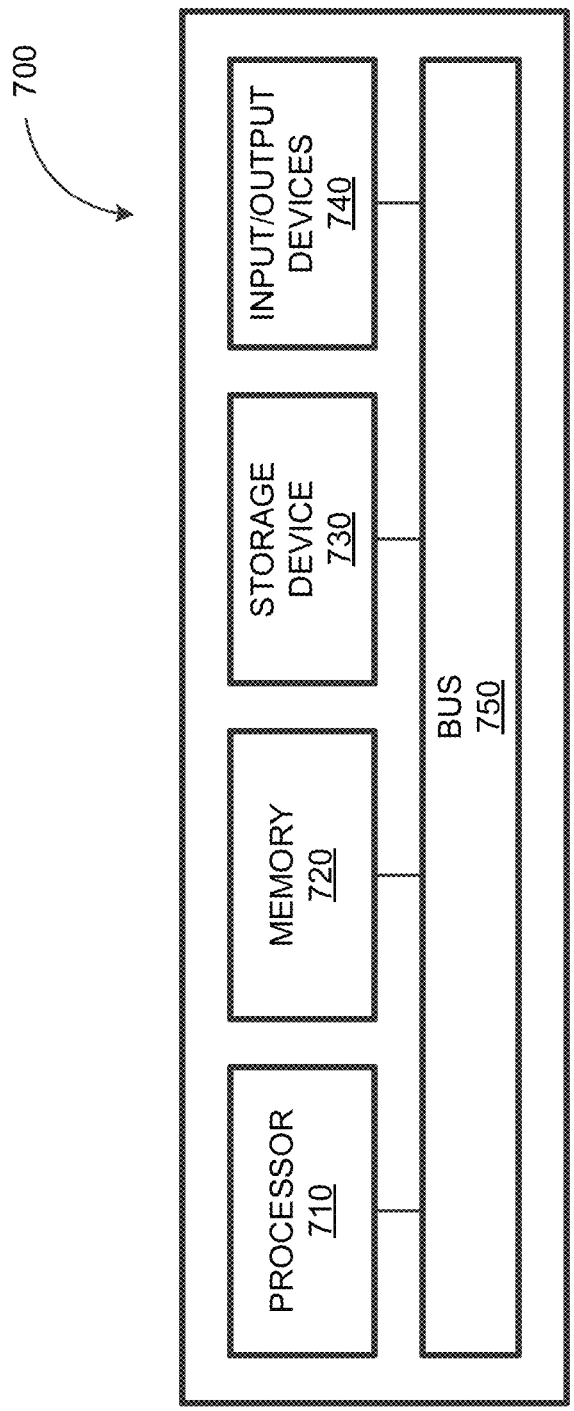
FIG. 7 depicts a block diagram illustrating a computing system, in accordance with some example embodiments.

FIG. 7 depicts a block diagram illustrating a computing system 700 consistent with implementations of the current subject matter. Referring to FIGS. 1-6, the computing system 700 can be used to implement the hybrid transactional analytical processing database 110 and/or any components therein.

As shown in FIG. 7, the computing system 700 can include a processor 710, a memory 720, a storage device 730, and input/output devices 740. The processor 710, the memory 720, the storage device 730, and the input/output devices 740 can be interconnected via a system bus 750. The processor 710 is capable of processing instructions for execution within the computing system 700. Such executed instructions can implement one or more components of, for example, the hybrid transactional analytical processing database 110. In some example embodiments, the processor 710 can be a single-threaded processor. Alternately, the processor 710 can be a multi-threaded processor. The processor 710 is capable of processing instructions stored in the memory 720 and/or on the storage device 730 to display graphical information for a user interface provided via the input/output device 740.

The memory 720 is a computer readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some example embodiments, the input/output device 740 includes a keyboard and/or pointing device. In various implementations, the input/output device 740 includes a display unit for displaying graphical user interfaces.

According to some example embodiments, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

In some example embodiments, the computing system 700 can be used to execute various interactive computer software applications that can be used for organization, analysis and/or storage of data in various formats. Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 740. The user interface can be generated and presented to a user by the computing system 700 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, cause operations comprising:
   responding to a query associated with one or more predicate columns and one or more aggregate columns by at least loading, from a disk into a first cache of memory, one or more partial data pages corresponding to the one or more predicate columns but not the one or more aggregate columns, wherein the query comprises an analytical processing query operating on the one or more predicate columns and the one or more aggregate columns;
   evaluating, for the one or more partial data pages, a first value occupying the one or more predicate columns to identify one or more rows satisfying a predicate associated with the query;
   loading, from the disk into the first cache of the memory, a first portion of a data page containing the one or more aggregate columns but not a second portion of the data page not containing the one or more aggregate columns, the loading of the first portion of the data page into the first cache evicting another partial data page from the first cache but not a full data page from a second cache; and
   generating, based at least on the first portion of the data page loaded in the memory, a result of the query corresponding to a second value occupying the one or more aggregate columns.

2. The system of claim 1, further comprising:
   identifying, based at least on an identifier of the one or rows satisfying the predicate, the data page as containing the one or more rows.

3. The system of claim 1, wherein the second portion of the data page not containing the one or more aggregate columns is not loaded into the memory in order to determine the result for the query.

4. The system of claim 1, wherein the memory includes the first cache for storing partial data pages and the second cache for storing full data pages, and wherein the first portion of the data page is loaded in the first cache.

5. The system of claim 4, further comprising:
   updating a data structure to indicate that the first portion of the data page has been loaded into the first cache; and
   in response to the data structure indicating that the data page has been loaded into the first cache in its entirety, transferring the data page from the first cache to the second cache.

6. The system of claim 4, further comprising:
in response to loading the first portion of the data page into the memory, applying one or more cache replacement policies to evict the second portion of another data page from the first cache.

7. The system of claim 6, wherein the one or more cache replacement policies include a least recently used policy and a least frequently used policy.

8. The system of claim 1, wherein each partial data page includes some but not all of the rows included in a database table.

9. The system of claim 1, further comprising:
performing one or more input output operations to access the first portion of the data page stored in the disk, the one or more input output operations being performed asynchronously by executing one or more coroutines.

10. The system of claim 1, wherein the one or more rows are identified by at least filtering the one or more predicate columns based at least on whether the first value occupying the one or more predicate columns satisfies the predicate.

11. The system of claim 1, wherein the result of the query is determined by applying, to the second value occupying the one or more aggregate columns, one or more operations including a drill up operation, a drill down operation, a slice and dice operation, an aggregation operation, a sort operation, a calculate key figures operation, and a hierarchy operation.

12. The system of claim 1, further comprising:
determining, based at least on a metadata associated with the data page, to load the first portion of the data page, the metadata being stored on a metadata page in the disk, and the metadata includes a byte range on the data page at which the one or more columns of data are stored.

13. The system of claim 1, further comprising:
generating a data structure identifying one or more portions of the data page required for responding to the query, the data structure including the first value for each portion of the data page required for responding to the query and the second value for each portion of the data page not required for responding to the query.

14. A computer-implemented method, comprising:
responding to a query associated with one or more predicate columns and one or more aggregate columns by at least loading, from a disk into a first cache of memory, one or more partial data pages corresponding to the one or more predicate columns but not the one or more aggregate columns, wherein the query comprises an analytical processing query operating on the one or more predicate columns and the one or more aggregate columns;

evaluating, for the one or more partial data pages, a first value occupying the one or more predicate columns to identify one or more rows satisfying a predicate associated with the query;

loading, from the disk into the first cache of the memory, a first portion of a data page containing the one or more aggregate columns but not a second portion of the data page not containing the one or more aggregate columns, the loading of the first portion of the data page into the first cache evicting another partial data page from the first cache but not a full data page from a second cache; and generating, based at least on the first portion of the data page loaded in the memory, a result of the query corresponding to a second value occupying the one or more aggregate columns.

15. The method of claim 14, further comprising:
identifying, based at least on an identifier of the one or rows satisfying the predicate, the data page as containing the one or more rows.

16. The method of claim 14, wherein the second portion of the data page not containing the one or more aggregate columns is not loaded into the memory in order to determine the result for the query.

17. The method of claim 14, wherein the memory includes the first cache for storing partial data pages and the second cache for storing full data pages, and wherein the first portion of the data page is loaded in the first cache.

18. A non-transitory computer readable medium storing instructions, which when executed by at least one data processor, result in operations comprising:
responding to a query associated with one or more predicate columns and one or more aggregate columns by at least loading, from a disk into a first cache of memory, one or more partial data pages corresponding to the one or more predicate columns but not the one or more aggregate columns, wherein the query comprises an analytical processing query operating on the one or more predicate columns and the one or more aggregate columns;

evaluating, for the one or more partial data pages, a first value occupying the one or more predicate columns to identify one or more rows satisfying a predicate associated with the query;

loading, from the disk into the first cache of the memory, a first portion of a data page containing the one or more aggregate columns but not a second portion of the data page not containing the one or more aggregate columns, the loading of the first portion of the data page into the first cache evicting another partial data page from the first cache but not a full data page from a second cache; and generating, based at least on the first portion of the data page loaded in the memory, a result of the query corresponding to a second value occupying the one or more aggregate columns.

* * * * *